United States Patent Office 3,145,105
Patented Aug. 18, 1964

3,145,105
SYNTHETIC FILM MATERIALS
Edward William Lee, Ilford, England, assignor to Ilford Limited, Ilford, England, a British company
No Drawing. Filed Sept. 15, 1961, Ser. No. 138,253
Claims priority, application Great Britain Sept. 29, 1960
20 Claims. (Cl. 96—87)

This invention relates to synthetic film materials, and more particularly to film base materials of use in the production of photographic materials.

It is known that self-supporting films formed of synthetic linear polyesters, particularly of the polyesters formed by reaction of ethylene glycol and terephthalic acid, may be prepared with mechanical and physical and chemical properties which render them very suitable indeed as base materials on which are coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, but the materials hitherto suggested for this purpose in connection with other types of film base have not proved satisfactory when applied to film base of synthetic linear polyesters of highly hydrophobic character.

It is an object of the present invention to provide a new method of subbing synthetic linear polyester film base to render it adapted to accept, and hold strongly adherent to it, a layer having a basis of gelatin, e.g. a gelatino silver halide emulsion layer.

According to the present invention there is provided a film base material consisting of a film of synthetic linear polyester of highly hydrophobic character having superimposed thereon, in order, (1) a layer consisting essentially of a mixture of a polyamide resin and a curable epoxy resin directly adherent to the said film, (2) a layer consisting essentially of a partially hydrolysed polyvinyl chloride-polyvinyl acetate copolymer adherent to said layer (1), and (3) a layer consisting essentially of a copolymer of methyl methacrylate with maleic acid or with itaconic acid containing free carboxyl groups adherent to layer (2).

Such a film base material accepts a gelatin-containing layer on layer (3) and the gelatin layer is strongly adherent thereto so that the whole assembly is highly resistant to peeling or frilling of the layers when handled in photographic processing baths.

The film of synthetic linear polyester is preferably a film formed from a polyester derived from ethylene glycol and terephthalic acid, and it is preferably one which has been molecularly oriented by stretching in one direction or in two directions at right angles. However, the film material may be of another highly hydrophobic polyester, e.g. a synthetic linear polycarbonate such as is described in British Patent No. 772,627. The foregoing types of polyester film material are readily obtainable commercially.

Layer (1) includes a polyamide resin, and this is advantageously a condensation product of polymerised linoleic acid with a polyamine, the product having an amine value of 80–100 determined by titration with HCl and expressed as mg. KOH/gm. This layer (1) also contains a curable epoxy resin. Suitable epoxy resins are those derived by reaction of diphenyl propane with epichlorhydrin and which have an epoxy equivalent (grams resin containing 1 equivalent of epoxide) of 450–525.

The relative proportions of the polyamide resin and the epoxy resin in layer (1) may vary widely, but generally substantially equal weights are suitable, e.g. within the range of 45 to 55% of the one to 55 to 45% of the other. Proportions of the polyamide resin less than 45% tend to give somewhat less adhesion, and proportions above 55% tend to give excessively rubbery films. This layer should be dried under conditions which effect a partial cure by reaction of amide and epoxy groups, e.g. by heating for 2 minutes or more at 120° C. or for shorter periods at slightly higher temperatures, e.g. 130° C.

Layer (2) consists essentially of a copolymer vinyl chloride-vinyl acetate which is partially hydroylsed so that it contains some free hydroxy groups. Preferably the analysis of the product should show vinyl chloride about 85–95%, vinyl acetate about 2 to 5% and polyvinyl alcohol about 5 to 10%. A very suitable product for use is one containing vinyl chloride 91%, vinyl acetate 3%, and vinyl alcohol 6%.

Layer (3) consists essentially of a copolymer of methyl methacrylate with maleic anhydride or itaconic acid, and preferably one which has an acid value of about 150–200, preferably 160–190. The maleic anhydride and itaconic acid resins may be made by copolymerisation in acetone solution with benzoyl peroxide as catalyst. Thus for example:

(a)

Methyl methacrylate _____ml__ 1100
Maleic anhydride _____gm__ 1100
Acetone _____ml__ 2200
Benzoyl peroxide _____gm__ 27.5 are polymerised for 48 hours at 65° C., and (b)

Methyl methacrylate _____ml__ 890
Itaconic acid _____gm__ 320
Benzoyl peroxide _____gm__ 15
Acetone _____ml__ 1200 are polymerised for 18 hours at 65° C.

Copolymers of low acid value, while not so suitable for use alone, may be used in admixture with copolymers of higher acid value.

In a modification of the coated film base material of this invention, the constituents of layers (1) and (2) may be mixed together to constitute a single layer.

In a further modification of the coated film base material of this invention, the copolymer of layer (3) may be added in the aforesaid gelatin-containing layer, thus avoiding the separate coating of layer (3) and the gelatin-containing layer.

According to a further feature of the present invention a product as defined above is prepared by successively coating a polyester film material with the constituents of layers (1), (2) and (3) respectively, each dissolved in a volatile solvent medium and each layer being dried before the next is applied. According to a modification of this method, for the production of a modified product as referred to above, the constituents of layers (1) and (2) are intermixed in a single solvent medium and applied as one coating layer.

In the production of layer (1) the constituents of the layer are preferably dissolved in a solvent medium containing methylene chloride since that solvent has usually some slight swelling action on the film material and this assists in keying layer (1) to the film material. Advantageously the components are dissolved separately to form stock solutions which are mixed together when required for use. The constituents of layers (2) and (3) may conveniently be applied from solution in solvent medium containing lower ketones, such as acetone or methyl ethyl ketone, methanol and toluene. Solvents which have a strong swelling action on layer (1) should be avoided as these may tend to loosen the adhesion of layer (1) to the film base. The solutions are preferably made up as concentrates in acetone and diluted to a convenient working strength with methanol when required for use.

The following examples will serve to illustrate the invention in these examples commercial resins are used and are as follows:

Versamid 100—A condensation product of polymerised linoleic acid and polyamines, of amine value 80–100.
Epikote 1001—Epoxy resin derived from epichlorhydrin and diphenyl propane of expoxide equivalent 450–525.
VinyliteVAGH—A partially hydrolysed polyvinyl-chloride-polyvinyl acetate of analysis, vinyl chloride 91%, vinyl acetate 3%, vinyl alcohol 6%.

In each example the coatings are applied to film based on the synthetic linear polyester obtained from ethylene glycol terephthalic acid.

Example 1

First coating: Mil.
  Versamid 100, 2.5% by weight in methylene chloride solution _____ 55
  Epikote 10.1 2.5% by weight in methylene chloride solution _____ 45
dried 1 hour at 100° C.

Second coating:
  Vinylite VAGH _____gm__ 3
  Methyl ethyl ketone _____ml__ 50
  Toluene _____ml__ 50 dried 15 minutes at 100° C.

Third coating:
  Methyl methacrylate-maleic acid resin (acid value 170–190) _____gm__ 2
  Acetone _____ml__ 35
  Methanol _____ml__ 65 dried 30 minutes at 80° C.

Example 2

First coating:
  Solution as in Example 1, dried 2 minutes at 120° C.
Second coating:
  Vinylite VAGH _____gm__ 0.75
  Methyl ethyl ketone _____ml__ 25
  Toluene _____ml__ 75 dried 15 minutes at 100° C.

Third coating:
  Methyl methacrylate-maleic acid resin (acid value 170–190) _____gm__ 2
  Acetone _____ml__ 50
  Methanol _____ml__ 50 dried 30 minutes at 80° C.

Example 3

First coating: Mil.
  Versamid 100, 2.5% by weight in methylene chloride _____ 44
  Epikote 1001, 2.5% by weight in methylene chloride _____ 36
  Vinylite VAGH 2.5% by weight in methylene chloride _____ 20

Coating dried for 4 minutes at 120° C.

Second coating:
  Methyl methacrylate-maleic anhydride resin, (acid value 170–190) _____gm__ 3
  Acetone _____ml__ 50
  Methanol _____ml__ 50
  Ethyl lactate _____ml__ 6

Allowed to dry approximately 2 minutes at 20–25° C.

Example 4

The procedure of Example 3 was used, but using for the first coating the following variants:

|  | Ml. | | |
|---|---|---|---|
|  | (a) | (b) | (c) |
| Versamid 100, 2.5% by weight in ethylene chloride__ | 38.5 | 33 | 27.5 |
| Epikote 1001, 2.5% by weight in methylene chloride__ | 31.5 | 27 | 22.5 |
| Vinylite VAGH, 2.5% by weight in methylene chloride__ | 30 | 40 | 50 |

Example 5

The procedures of Examples 3 and 4 were followed but using for the second coating:
Methyl methacrylate-itaconic acid resin, acid value 160–190 _____gm__ 3
Acetone _____ml__ 50
Methanol _____ml__ 50
Ethyl lactate _____ml__ 6

Example 6

As Examples 3 and 4 except that the solutions for the second coating comprised:

Methyl methacrylate-maleic anhydride resin, acid value 80–90 _____ gm__ 0.75
Methyl methacrylate-maleic anhydride resin, acid value 170–190 _____gm__ 2.25
Acetone _____ml__ 50
Methanol _____ml__ 50
Ethyl lactate _____ml__ 6

Example 7

The following coatings are applied in order to film based on the synthetic linear polyester obtained from ethylene glycol and terephthalic acid.

First coating:
  Epikote 1001 _____gm___1.25
  Versamid 100 _____gm___ 1.25
  Methylene chloride _____ml___ 100

This coating is partially cured by heating, e.g. for 3 minutes at 115° C. It is then coated with—

Second coating:
  Vinylite VAGH _____gm__ 2
  Methyl ethyl ketone _____ml__ 30
  Toluene _____ml__ 70
  Ethyl lactate _____ml__ 6
or alternatively with—
  Vinylite VAGH _____gm__ 2
  Methyl ethyl ketone _____ml__ 30
  Toluene _____ml__ 80
  Ethyl lactate _____ml__ 4

The second coating is dried at 115° C. for a sufficient time to remove most of the ethyl lactate, e.g. for 5 to 15 minutes.

A gelatin coating is then applied having the following composition:

| | | |
|---|---|---|
| Gelatin | gm | 0.8 |
| Distilled water | ml | 1.6 |
| Salicylic acid | gm | 0.2 |
| Methanol | ml | 38.4 |
| Acetone | ml | 40 |
| Methyl methacrylate-itaconic acid copolymer, acid value 70-120 | gm | 0.4-0.8 |
| Acetone | ml | 10 |
| Methanol | ml | 10 |
| Chromium chloride 1% in methanol | ml | 0.2-1.0 |
| Ethyl lactate | ml | 2-6 |

This coating is dried for 30 minutes at 100-120° C.

In the foregoing formulations a vinyl chloride-vinyl acetate-maleic anhydride copolymer may be substitued for the Vinylite VAGH with like effect, e.g. the material Vinylite VMCH.

The final coating on each of products of the foregoing Examples 1-6 was preferably then coated with a gelatin layer applied from the following solution:

| | | |
|---|---|---|
| Gelatin | gm | 1 |
| Distilled water | ml | 2 |
| Salicylic acid | gm | 0.2 |
| Methanol | ml | 50 |
| Ethanol | ml | 50 |

The aforesaid solution may contain a hardening agent, e.g. 0.5-1 ml. per litre of 40% by weight aqueous formaldehyde, or 1% by weight aqueous chromic chloride. This coating was dried for 10 minutes at 80° C.

Subsequently there could be applied to the gelatin coating of each of the products of Examples 1-7 a layer of a photographic gelatino silver halide emulsion of conventional type. It was found that in all cases the layers were strongly adherent one to another and to the film support so that the final photographic film could be processed without danger of separation of the layers or frilling. Moreover, the processed and dried films could be heated to 80° C. for half an hour without cracks developing in the photographic emulsion or separation of the emulsion layer.

Whilst the examples set forth precise data for the compositions, it will be understood that the absolute and relative quantities of the ingredients may be varied while still obtaining satisfactory results.

It is particularly to be noted that the subbing method of the present invention avoids the use of cellulose nitrate, a material which is commonly employed in subbing formulae. The curing of the epoxy resin is effected during the hot-drying of the layers, and this can be achieved without the danger, which arises when the cellulose nitrate is present, of reaction between the cellulose nitrate and the amine groups, which has adverse effects on photographic stability.

What I claim is:

1. A film base material consisting of a film of synthetic linear polyester of highly hydrophobic character having superimposed thereon, in order, (1) a mixture consisting essentially of a polyamide resin and a curable epoxy resin directly adherent to the said film, (2) a partially hydrolysed polyvinyl chloride-polyvinyl acetate copolymer and (3) a copolymer of methyl methacrylate with a compound selected from the class consisting of maleic acid and itaconic acid, said copolymer containing free carboxyl groups.

2. A film base material consisting of a film of synthetic linear polyester of highly hydrophobic character having superimposed thereon, in order, (1) a layer consisting essentially of a mixture of a polyamide resin and a curable epoxy resin directly adherent to the said film, (2) a layer consisting essentially of a partially hydrolysed polyvinyl chloride-polyvinyl acetate copolymer adherent to said layer (1), and (3) a layer consisting essentially of a copolymer of methyl methacrylate with a compound selected from the class consisting of maleic acid and itaconic acid, said copolymer containing free carboxyl groups, adherent to layer (2).

3. A film base material consisting of a film of synthetic linear polyester of highly hydrophobic character having, directly adherent to said film, a layer consisting essentially of a mixture of a polyamide resin, a curable epoxy resin and a partially hydrolysed polyvinyl chloride-polyvinyl acetate copolymer and, superimposed thereon, a copolymer of methyl methacrylate with a compound selected from the class consisting of maleic acid and itaconic acid, said copolymer containing free carboxyl groups.

4. A film base material consisting of a film of synthetic linear polyester of highly hydrophobic character having superimposed thereon, in order, (1) a layer consisting essentially of a mixture of a polyamide resin and a curable epoxy resin directly adherent to the said film, (2) a layer consisting essentially of a partially hydrolysed polyvinyl chloride-polyvinyl acetate copolymer, and (3) a layer consisting essentially of a mixture of gelatin and a copolymer of methyl methacrylate with a compound selected from the class consisting of maleic acid and itaconic acid, said copolymer containing free carboxyl groups.

5. A film base material consisting of a film of synthetic linear polyester of highly hydrophobic character having superimposed thereon, in order, (1) a layer consisting essentially of a mixture of a polyamide resin and a curable epoxy resin directly adherent to the said film, (2) a layer consisting essentially of a partially hydrolysed polyvinyl chloride-polyvinyl acetate copolymer, (3) a layer consisting essentially of a copolymer of methyl methacrylate with a compound selected from the class consisting of maleic acid and itaconic acid, said copolymer containing free carboxyl groups, and a layer containing gelatin.

6. A film base material consisting of a film of synthetic linear ethylene glycol terephthalate polyester of highly hydrophobic character having superimposed thereon, in order, (1) a mixture consisting essentially of a polyamide resin and a curable epoxy resin directly adherent to the said film, (2) a partially hydrolysed polyvinyl chloride-polyvinyl acetate copolymer, and (3) a copolymer of methyl methacrylate with a compound selected from the class consisting of maleic acid and itaconic acid, said copolymer containing free carboxyl groups.

7. A film base material consisting of a film of synthetic linear ethylene glycol terephthalate polyester of highly hydrophobic character having superimposed thereon, in order, (1) a mixture consisting essentially of a polyamide resin and a curable epoxy resin directly adherent to the said film, (2) a partially hydrolysed polyvinyl chloride-polyvinyl acetate copolymer, (3) a copolymer of methyl methacrylate with a compound selected from the class consisting of maleic acid and itaconic acid, said copolymer containing free carboxyl groups, and (4) a gelatin-containing layer.

8. A film base material consisting of a film of synthetic linear ethylene glycol terephthalate polyester of highly hydrophobic character having superimposed thereon, in order, (1) a mixture consisting essentially of a curable epoxy resin and a condensation product of polymerised linoleic acid and a polyamine which product has an amine value of 80-100 mg. KOH/gm., directly adherent to the said film, (2) a partially hydrolysed polyvinyl chloride-polyvinyl acetate copolymer, and (3) a copolymer of methyl methacrylate with a compound selected from the class consisting of maleic acid and itaconic acid, said copolymer containing free carboxyl groups.

9. A film base material consisting of a film of synthetic linear ethylene glycol terephthalate polyester of highly hydrophobic character having superimposed thereon, in order, (1) a mixture consisting essentially of a polyamide resin and a curable epoxy resin which is a reaction product of diphenylpropane with epichlorhydrin of epoxy equivalent 450–525, directly adherent to the said film, (2) a partially hydrolysed polyvinyl chloride-polyvinyl acetate copolymer, and (3) a copolymer of methyl methacrylate with a compound selected from the class consisting of maleic acid and itaconic acid, said copolymer containing free carboxyl groups.

10. A film base material consisting of a film of synthetic linear ethylene glycol terephthalate polyester of highly hydrophobic character having superimposed thereon, in order, (1) a mixture consisting essentially of a polyamide resin and a curable epoxy resin, each constituting 45 to 55% of the mixture, directly adherent to the said film, (2) a partially hydrolysed polyvinyl chloride-polyvinyl acetate copolymer, and (3) a copolymer of methyl methacrylate with a compound selected from the class consisting of maleic acid and itaconic acid, said copolymer containing free carboxyl groups.

11. A film base material consisting of a film of synthetic linear ethylene glycol terephthalate polyester of highly hydrophobic character having superimposed thereon, in order, (1) a mixture consisting essentially of substantially equal parts of a polyamide resin and a curable epoxy resin directly adherent to the said film, (2) a partially hydrolysed polyvinyl chloride-polyvinyl acetate copolymer containing 85 to 95% vinyl chloride and having an acid value of 150–200, and (3) a copolymer of methyl methacrylate with a compound selected from the class consisting of maleic acid and itaconic acid, said copolymer containing free carboxyl groups.

12. A photographic material consisting of a film of synthetic linear polyester of highly hydrophobic character having superimposed thereon, in order, (1) a mixture consisting essentially of a polyamide resin and a curable epoxy resin directly adherent to the said film, (2) a partially hydrolysed polyvinyl chloride-polyvinyl acetate copolymer, (3) a copolymer of methyl methacrylate with a compound selected from the class consisting of maleic acid and itaconic acid, said copolymer containing free carboxyl groups, (4) a gelatin-containing layer, and (5) a layer of a photograpihc gelatino silver halide emulsion.

13. A process for the production of film base material which comprises applying to a film of synthetic linear polyester of highly hydrophobic character, in order, (1) a layer consisting essentially of a mixture of a polyamide resin and a curable epoxy resin, (2) a layer consisting essentially of a partially hydrolysed polyvinyl chloride-polyvinyl acetate copolymer, and (3) a layer consisting essentially of a copolymer of methyl methacrylate with a compound selected from the class consisting of maleic acid and itaconic acid, said copolymer containing free carboxyl groups, the constituents of each of said layers being dissolved in a volatile solvent medium and each layer being dried before the next is applied, the drying conditions being such for the layer containing the polyamide and epoxy resins that a partial cure of the layer is effected by reaction of amide and epoxy groups.

14. A process for the production of a film base material which comprises applying to a film of synthetic linear polyester of highly hydrophobic character, in order, (1) a layer consisting essentially of a mixture of a polyamide resin and a curable epoxy resin, (2) a layer consisting essentially of a partially hydrolysed polyvinyl chloride-polyvinyl acetate copolymer, and (3) a layer consisting essentially of a copolymer of methyl methacrylate with a compound selected from the class consisting of maelic acid and itaconic acid, said copolymer containing free carboxyl groups, the constituents of each said layer being dissolved in a volatile solvent medium and each layer being dried before the next is applied, the layer containing the polyamide and epoxy resins being subjected to heat treatment at 120–130° C.

15. A process for the production of a film base material which comprises applying to a film of synthetic linear polyester of highly hydrophobic character, in order, (1) a layer consisting essentially of a mixture of a polyamide resin and a curable epoxy resin, (2) a layer consisting essentially of a partially hydrolysed polyvinyl chloride-polyvinyl acetate copolymer, and (3) a layer consisting essentially of a copolymer of methyl methacrylate with a compound selected from the class consisting of maleic acid and itaconic acid, said copolymer containing free carboxyl groups, the constituents of layer (1) being applied from solution in a medium containing methylene chloride and the constituents of layers (2) and (3) being applied from solution in media containing lower ketone, methanol and toluene, and each layer being dried before the next is applied, the layer containing the polyamide resin and the epoxy resin being subjected to heat treatment at 120–130° C.

16. A process for the production of a film base material which comprises applying to a film of synthetic linear alkylene glycol terephthalate polyester of highly hydrophobic character, in order, (1) a mixture consisting essentially of a polyamide resin and a curable epoxy resin directly adherent to the said film, (2) a partially hydrolysed polyvinyl chloride-polyvinyl acetate copolymer, and (3) a copolymer of methyl methacrylate with a compound selected from the class consisting of maleic acid and itaconic acid, said copolymer containing free carboxyl groups, the layers being deposited from solutions of the constituents in organic solvent media, each layer being dried before the next is applied and the layer containing the polyamide and epoxy resins being heated at 120–130° C., and depositing on layer (3) a layer containing gelatin.

17. A process for the production of a photographic film material which comprises applying to a film of synthetic linear ethylene glycol terephthalate polyester of highly hydrophobic character, in order, (1) a solution of a mixture consisting essentially of a polyamide resin and a curable epoxy resin directly adherent to the said film, (2) a solution of a partially hydrolysed polyvinyl chloride-polyvinyl acetate copolymer, and (3) a solution of a copolymer of methyl methacrylate with a compound selected from the class consisting of maleic acid and itaconic acid, said copolymer containing free carboxyl groups, drying each coating before the next is applied, heating the layer containing the polyamide and epoxy resins to 120–130° C., applying a gelatin layer to layer (3), and depositing on said gelatin layer a layer of a gelatino silver halide photographic emulsion.

18. A process for the production of a photographic film which comprises applying to a film of synthetic linear ethylene glycol terephthalate polyester of highly hydrophobic character, in order, (1) a solution of a mixture consisting essentially of a polyamide resin and a curable epoxy resin directly adherent to the said film, (2) a solution of partially hydrolysed polyvinyl chloride-polyvinyl acetate copolymer, and (3) a solution containing gelatin and a copolymer of methyl methacrylate with a compound selected from the class consisting of maleic acid and itaconic acid, said copolymer containing free carboxyl groups, drying each coating before the next is applied, heating the layer containing the polyamide and epoxy resins to 120°–130° C., and depositing a gelatino silver halide photographic emulsion on layer (3).

19. A film base material consisting of a film of synthetic linear ethylene glycol terephthalate polyester of highly hydrophobic character having superimposed thereon, in order, (1) a layer consisting essentially of a mixture of substantially equal amounts of a polyamide resin which is a condensation product of polymerized linoleic acid with a polyamine, of amine value 80–100 mg. KOH/gm., and a curable epoxy resin which is a reaction product of diphenylpropane with epichlorhydrin and has an epoxy equivalent of 450–525, directly adherent to the said film, (2) a partially hydrolysed polyvinyl chloride-polyvinyl acetate copolymer containing 85–95% of vinyl chloride and having an acid value of 150–200, and (3)

a copolymer of methyl methacrylate with a compound selected from the class consisting of maleic acid and itaconic acid, said copolymer containing free carboxyl groups.

20. A film base material consisting of a film of synthetic linear ethylene glycol terephthalate polyester of highly hydrophobic character having superimposed thereon, in order, (1) a layer consisting essentially of a mixture of substantially equal amounts of a polyamide resin which is a condensation product of polymerised linoleic acid with a polyamine, of amine value 80–100 mg. KOH/gm., and a curable epoxy resin which is a reaction product of diphenylpropane with epichlorhydrin and has an epoxy equivalent of 450–525, directly adherent to the said film, (2) a partially hydrolysed polyvinyl chloride-polyvinyl acetate copolymer containing 85–95% of vinyl chloride and having an acid value of 150–200, (3) a copolymer of methyl methacrylate with a compound selected from the class consisting of maleic acid and itaconic acid, said copolymer containing free carboxyl groups, and (4) a gelatin-containing layer.

References Cited in the file of this patent
UNITED STATES PATENTS

| | | |
|---|---|---|
| 2,204,608 | McNally et al. | June 18, 1940 |
| 2,874,046 | Klockgether et al. | Feb. 17, 1959 |
| 2,943,000 | Austin | June 28, 1960 |
| 2,955,054 | Park et al. | Oct. 4, 1960 |
| 2,979,419 | Hill et al. | Apr. 11, 1961 |